United States Patent [19]

Sawayama et al.

[11] Patent Number: 5,512,645
[45] Date of Patent: Apr. 30, 1996

[54] LACTAM RING CONTAINING POLYMER

[75] Inventors: Shigeru Sawayama; Yasuharu Mori; Yukino Nagai, all of Yokohama, Japan

[73] Assignee: Mitsubishi Chemical Corporation, Tokyo, Japan

[21] Appl. No.: 343,640

[22] Filed: Nov. 22, 1994

[30] Foreign Application Priority Data

Nov. 25, 1993 [JP] Japan ..................... 5-295297

[51] Int. Cl.$^6$ ............ C08F 226/06; C08F 220/06; C08F 220/10; C08F 220/56; C08F 226/02; C08F 228/02

[52] U.S. Cl. .............. 526/264; 526/288; 526/303.1; 526/312; 526/310; 526/317.1; 526/328.5; 525/329.4

[58] Field of Search ................. 526/264, 288, 526/303.1, 310, 312, 317.1, 328.5; 525/329.4

[56] References Cited

U.S. PATENT DOCUMENTS

| | | |
|---|---|---|
| 4,595,737 | 6/1986 | Straub et al. |
| 4,808,683 | 2/1989 | Itagaki et al. |
| 4,921,621 | 5/1990 | Costello et al. |
| 4,957,977 | 9/1990 | Itagaki et al. |
| 5,037,927 | 8/1991 | Itagaki et al. |
| 5,064,909 | 11/1991 | Itagaki et al. |
| 5,281,340 | 1/1994 | Sato et al. |

FOREIGN PATENT DOCUMENTS 3-118804  5/1991  Japan.

OTHER PUBLICATIONS

Erich E. L. Kathmann, and Charles L. McCormick, Macromolecules 26, 5249–5252, 1993.
C. Chang et al., "Determination of the Sequence Distribution and Ionization Constant of Poly (Acrylic Acid–Co–Vinylamine) by C–13 NMR", *Journal of Polymer Science: Polymer Symposium 74*, 17–30 (1968).

*Primary Examiner*—Joseph L. Schofer
*Assistant Examiner*—Wu C. Cheng
*Attorney, Agent, or Firm*—David G. Conlin; David S. Resnick

[57] ABSTRACT

There is provided a lactam ring-containing polymer comprising: 20 to 100 molar % of a structural unit represented by the general formula (1); 0 to 70 molar % of a structural unit represented by the general formula (2); and 0 to 70 molar % of a structural unit represented by the general formula (3) and/or a structural unit represented by the general formula (4):

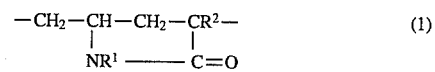

(1)

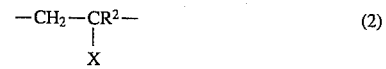

(2)

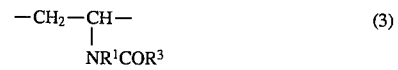

(3)

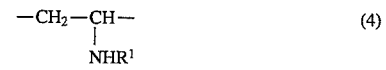

(4)

wherein $R^1$, $R^2$ and $R^3$ each represents a hydrogen atom or a methyl group, and X represents $COOR^4$ and/or $CONR^5R^6$ in which $R^4$, $R^5$ and $R^6$ each represents a hydrogen atom or a C1–C4 alkyl.

The polymer is excellent in heat resistance and is expected to be used for resin modifiers, polymeric additives for petroleum tertiary recovery, and other various applications.

15 Claims, No Drawings

LACTAM RING CONTAINING POLYMER

BACKGROUND OF THE INVENTION

The present invention relates to a lactam ring-containing polymer.

N-vinylamide polymer as well as vinylamine unit-containing polymer derived therefrom through hydrolysis are considered interesting for their possible application to thermoplastic resin compatibilizing agents, dispersants, binders, thickeners and the like by making use of highly polar amino or amido group therein.

For instance, Japanese Patent Application Laying Open (Kokai) No. 57-517017 discloses that a copolymer of acrylamide, N-vinylacylamide and vinylsulfonic acid as well as its hydrolyzate have good long-term temperature stability and are suitable for petroleum tertiary recovery.

On the other hand, it is known that, during the Schmidt reaction of polyacrylic acid, according to which carboxylic groups therein are partly converted into amino groups, an amino group of a polymeric unit and an carboxylic group of a polymeric unit adjacent thereto may form a lactam ring (Journal of Polymer Science: Polymer Symposium 74, 17–30(1986)). This reaction, however, could be hardly applicable to practically produce a polymer having a high lactam ring content, since the conversion into amino groups occurs only with unsatisfactory efficiency. Furthermore, the obtained lactam ring-containing polymers are remained unknown about physical properties thereof.

Japanese Patent Application Laying Open (Kokai) No. 3-118804 shows that upon modification of a copolymer of N-vinylacetamide and acrylonitrile, a lactam ring may be formed through a reaction between an amino group derived from the vinylacetamide and an amido group in acrylamide derived from the acrylonitrile. According to the Examples of this patent application, lactam ring-containing structural units are as low as at most 8 molar % in the polymer, and there is no disclosure of a polymer having a high lactam ring content, nor any mention of advantageous effects on the physical properties offered by a lactam ring-containing structural unit.

The primary object of the present invention is therefore to provide a polymer which contains polar groups such as amido and amino groups and which exhibits good physical properties including thermal stability.

SUMMARY OF THE INVENTION

The inventors, as a result of various studies and examinations with a view to accomplishing their object, have found that copolymerization of a couple of monomers such as N-vinylformamide and acrylamide followed by modification of the obtained copolymer under relatively strong conditions could give a novel polymer having a high lactam ring content and having a good thermal stability, and thus reached the present invention.

DESCRIPTION OF THE INVENTION

According to the present invention, a lactam ring-containing polymer comprises: 20 to 100 molar % of a structural unit represented by the general formula (1); 0 to 70 molar % of a structural unit represented by the general formula (2); and 0 to 70 molar % of a structural unit represented by the general formula (3) and/or a structural unit represented by the general formula (4):

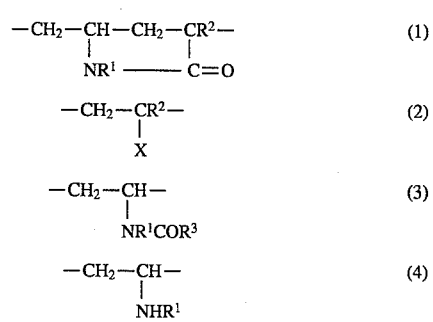

wherein, $R^1$, $R^2$ and $R^3$ each represents a hydrogen atom or a methyl group; and X represents $COOR^4$ and/or $CONR^5R^6$ in which $R^4$, $R^5$ and $R^6$ each represents a hydrogen atom or a C1–C4 alkyl group.

Typically, a lactam ring-containing polymer of the present invention comprises; 30 to 80 molar % of the structural unit (1); 5 to 50 molar % of the structural unit (2); and 5 to 50 molar % of the structural unit (3) and/or (4). In general, the higher content of the structural unit (1), the higher heat resistance. For example, a polymer containing 30 to 80 molar %, preferably 40 to 80 molar %, of the structural unit (1) is more excellent in heat resistance. The structural unit (1) will be hereinafter often called as "lactam unit".

The lactam unit-containing polymer may generally be produced by, but not limited to, a process wherein an ethylenically unsaturated monomer having a primary amino group or a substituted amino group from which a primary amino group can be derived through some reaction is copolymerized with an ethylenically unsaturated monomer having a carboxylic group or a group from which a carboxylic group can be derived through some reaction, and thereafter the primary amino group is reacted with an carboxylic group adjacent thereto to form a lactam unit in the copolymer.

The ethylenically unsaturated monomer having a substituted amino group is preferably represented by the general formula (5):

in which $R^1$ and $R^3$ each represents a hydrogen atom or a methyl group.

Compounds of the general formula (5) may include N-vinylformamide, N-vinylacetamide, N-methyl-N-vinylformamide and N-methyl-N-vinylacetamide. Preferably, N-vinylformamide or N-vinylacetamide, more preferably N-vinylformamide is used since a primary amino group can be efficiently produced through chemical modification.

The ethylenically unsaturated monomer having a carboxylic group or a group from which a carboxylic group can be derived through some reaction is preferably represented by the general formula (6):

wherein $R^2$ represents a hydrogen atom or a methyl group, and X represents $COOR^4$ and/or $CONR^5R$ in which $R^4$, $R^5$ and $R^6$ each represents a hydrogen atom or a C1–C4 alkyl group.

Compounds of the general formula (6) may include (meth)acrylic acid, (meth)acrylamide and (meth)acrylic esters. Acrylamide or an acrylic ester is preferred in view of the reactivity for lactam ring formation. Acrylamide is particularly preferred since a lactam ring may be more easily formed in an alternating copolymer in which compounds of the general formulas (5) and (6) are repeated more highly alternately.

The molar ratio of a compound of the general formula (5) to a compound of the general formula (6) on copolymerization is preferably within the range of 20:80 to 80:20, more preferably within the range of 40:60 to 60:40.

The mixture to be copolymerized may contain other monomeric compounds than those of the general formulas (5) and (6), provided that the obtained polymer falls within the scope of the lactam ring-containing polymer of the present invention without departing from the specified composition while exhibiting the characteristic excellent heat resistance. These other monomeric compounds may include: neutral monomers such as allyl alcohol and vinyl alcohol; basic monomers such as N-vinyl pyrrolidone, vinyl pyridines, vinyl imidazoles, (meth) acrylamide alkyltrimethylammonium salts, hydroxyalkyl (meth)acryloyloxy alkyltrimethylammonium salts, diallyl alkyl ammonium salts, and vinylbenzyl trialkylammonium salts; metallic salts or ammonium salts of acidic monomers such as (meth)acrylamide alkanesulfonic acids, (meth)acrylic acid, (meth)acryloyloxy alkanesulfonic acids, (meth)allyl sulfonic acid, and vinyl sulfonic acid; unsaturated ketones such as methyl vinyl ketone, ethyl vinyl ketone, phenyl vinyl ketone, and methyl isopropenyl ketone; vinyl esters such as vinyl acetate, vinyl propionate, vinyl butyrate, and vinyl benzoate; vinyl ethers; vinyl or vinylidene halides such as vinyl chloride, vinyl bromide, and vinylidene chloride; olefins such as ethylene, and propylene; glycidyl methacrylate, and styrene.

Monomers set forth above may be copolymerized according to bulk polymerization, or any of solution polymerization, precipitation polymerization, dispersion polymerization, suspension polymerization, and emulsion polymerization using water or various organic solvents. When monomers are subjected to solution polymerization, process conditions such as monomer concentration, polymerization mode, polymerizer shape and the like may be suitably selected depending on various factors including a molecular weight of an end polymer, polymerization exotherm and the like. For example, a starting solution containing 5 to 20 % by weight of monomers may be polymerized to obtain an end polymer in the form of a solution or precipitate, or a starting solution containing 20 to 60 % by weight of monomers may be polymerized to obtain an end product in the form of a solvent-containing gel or precipitate. The liquid mixture containing the polymer obtained through solution polymerization may be continuously subjected to chemical modification by adding thereto an acid or a base followed by heating.

Although both radical polymerization and ionic polymerization may be possible, radical polymerization will be preferred because of easier molecular weight control. Any of radical polymerization initiators commonly used for the polymerization of water-soluble or oil-soluble monomers may be used. When water is used as polymerization solvent, a water-soluble azo compound will be preferably used as polymerization initiator. Examples therefor may include 2,2'-azobis-2-amidinopropane dihydrochloride, azobis isobutyronitrile and the like. Polymerization reaction is conducted in the presence of an initiator generally in an amount of 0.01 to 10 % by weight of the monomer weight, under an inert gas stream, at a temperature of 40° C. to 150° C.

The obtained polymer is then subjected to chemical modification to form a lactam ring. According to this chemical modification, a primary amino group derived from a substituted amino group in the polymer is reacted with an adjacent carboxylic group initially contained in the polymer or derived from an ester or amido group of the polymer to finally form a lactam ring through dehydration.

For instance, this chemical modification may be conducted in the presence of an acid or a base in an excess of at least equivalent relative to the substituted amino group or the carboxylic group with heating at a temperature usually of 50° to 200° C., preferably of 60° to 120° C. Although the modification of solid polymer may be possible, the modification of polymer in solvent, in particular in aqueous solution is preferred. Modification in an acidic aqueous solution is preferred. In particular, modification in the presence of an aqueous solution containing an acid in at least equimolar amount based on the structural unit derived from the compound of the general formula (5), that is to say, modification in the presence of an aqueous solution containing an acid in an excess of at least an equivalent relative to the substituted amino group in the structural unit derived from the compound of the general formula (5), is the most preferable because of the easiest lactam ring formation. Whereas, modification in a basic aqueous solution is liable to make the polymer ampholytic through hydrolysis and thus rather unsuitable to increase a lactam ring content. Suitable acids may include strong acids such as hydrochloric acid, sulfuric acid, sulfamic acid and the like, and suitable bases may include strong bases such as sodium hydroxide, potassium hydroxide and the like. To the reaction system during modification, the addition of hydroxylamine hydrochloride or sulphate will be effective to inhibit the occurence o reticulation of the polymer caused by the compounds derived from the unreacted monomeric compound of the general formula (5).

Various reaction conditions during modification will be suitably selected depending on the copolymer composition, the physical properties of the end lactam ring-containing polymer and the like. For example, water solubility of the polymer of the present invention depends on the hydrophilicity-hydrophobicity balance of the functional groups therein. When copolymer of N-vinylformamide and acrylamide is acid hydrolysed, water solubility is liable to decrease with the formation of a lactam ring. Whereas, modification in the presence of a largely excessive acid will give rise to a high carboxylic group content, making the polymer water-soluble.

By copolymerizing with other water-soluble monomer such as acrylamide-2-methylpropanesulfonic acid, it is possible to keep the polymer water-soluble even if lactam units increase. Water-soluble polymer will be particularly suitable for petroleum tertiary recovery. Whereas resin modifier does not always require water-solubility and thus, for such application, sparingly water-soluble polymer having a high lactam unit content may be utilized.

As for the molecular weight range of polymers of the present invention, it cannot unambiguously be determined based on the reduced viscosity, since sparingly water-soluble polymers are encompassed herein as described above.

However, the unmodified copolymer before formation of a lactam ring is generally water-soluble and 1N aqueous NaCl solution containing 0.1 g/dl of the above copolymer exhibits a reduced viscosity of usually 0.01 to 50 dl/g, in particular 0.05 to 20 dl/g at 25° C. Relatively high viscous polymer of usually 1 to 50 dl/g, preferably 3 to 50 dl/g is used for petroleum tertiary recovery, whereas relatively low viscous polymer of usually 0.01 to 20 dl/g, preferably 0.1 to 15 dl/g is used for resin modifier. Water-soluble polymer of the present invention exhibits almost the same reduced viscosity range as the above unmodified polymer, i.e. 1N aqueous NaCl solution containing 0.1 g/dl of the polymer exhibits a reduced viscosity of usually 0.01 to 50 dl/g, in particular 0.05 to 20 dl/g at 25° C.

EXAMPLES

The present invention will now be described in more detail by way of examples, which should be considered by no means limitative without departing from the spirit of the invention.

Example 1

(Preparation of Polymer A)

To a one-liter 4-necked separable flask provided with a stirrer, a nitrogen inlet and a condenser, 445 g of desalted water, 25 g of acrylamide and 25 g of N-vinylformamide were introduced, and then deaerated under nitrogen gas stream with agitation for 30 minutes. The reaction mixture was heated to 60° C., 5 g of 3% aqueous solution of 2,2'-azobis-2-amidinopropane hydrochloride was added, and thereafter polymerized at 60° C. for 2 hours then at 70° C. for 1 hour. The obtained reaction solution was added into methanol to precipitate a polymer, which was then dried to obtain Polymer A. A solution containing 0.1 g/dl of Polymer A in 1N aqueous NaCl was prepared. This polymer solution showed a reduced viscosity of 11.8 at 25° C.

(Preparation of Polymer B)

One gram of Polymer A, 0.5 g of hydroxylamine hydrochloride and 7.5 g of desalted water were introduced into a sealed tube and heated to 70° C. to obtain a homogeneous solution. One hour later, a mixed solution of 0.73 g of concentrated hydrochloric acid and 1.27 g of desalted water was added and heated for further 7 hours. The obtained reaction solution was added into methanol to precipitate a polymer, which was then dried to obtain Polymer B. This polymer was sparingly water-soluble.

(Compositional Analysis)

In Polymer B, proportion of each structural unit was calculated from the integral of $^{13}$C-NMR absorption peak corresponding to each structural unit.

According to the teachings of C. CHANG et al. (Journal of Polymer Science; Polymer Symposium 74, 7–30 (1986)), absorption peaks at 182 ppm, 180 ppm, 179 ppm and 165 ppm were attributed to carbonyl carbon of lactam ring, carbonyl carbon of acrylamide, carbonyl carbon of acrylic acid and carbonyl carbon of N-vinylformamide, respectively. A vinylamine unit content was calculated by subtracting the sum of N-vinylformamide content and lactam ring content in the polymer from the initial charge of N-vinylformamide.

The results of the structural analysis are shown in Table 1, in which each structural unit represents the following:

lactam: general formula (1) in which $R^1 = R^2 = H$;
amide: general formula (2) in which $R^2 = H$, $X = CONH_2$;
carboxyl: general formula (2) in which $R^2 = H$, $X = COOH$;
formyl: general formula (3) in which $R^1 = H$; and
amine: general formula (4) in which $R^1 = H$, in the form of hydrochloride.

(Thermal Stability Test)

A sample of Polymer B was heated up from 20° C. at a rate of 15° C./min. under nitrogen gas stream of 200 ml/min. and the weight loss of the sample was measured by means of differential thermogravimeter (TG-DTA). The results are shown in Table 1.

Example 2

1 g of Polymer A and 19 g of concentrated hydrochloric acid were introduced into a sealed tube and heated at 75° C. for 7 hours. Thereafter, the reaction solution was added to acetone to precipitate a polymer, which was then dried to obtain Polymer C. This polymer C was water-soluble. The results of structural analysis and thermal stability test of Polymer C are shown in Table 1.

1N aqueous NaCl solution containing 0.1 g/dl of Polymer C was purged with nitrogen and then sealed to prepare a sample. The obtained sample was heated at 90° C. for 10 hours and the reduced viscosity thereof was measured. Viscosity retention percentage based on the viscosity before heating is shown in Table 3.

Example 3

1 g of Polymer A, 0.7 g of concentrated hydrochloric acid and 18.3 g of desalted water were introduced into a sealed tube and heated at 85° C. for 7 hours. Thereafter the reaction solution was added to methanol to precipitate a polymer, which was then dried to obtain Polymer D. This polymer D was sparingly water-soluble. The results of structural analysis and thermal stability test of Polymer D are shown in Table 1.

Comparative Example 1

To a one-liter 4-necked separable flask provided with a stirrer, a nitrogen gas inlet and a condenser, 320 g of desalted water was introduced, heated to 70° C. and then deaerated under nitrogen gas stream with agitation. To the flask 10 g of 10% w/w aqueous solution of 2,2'-azobis-2-amidinopropane hydrochloride (aqueous initiator solution) was added, and immediately started to drop 170 g of 60% w/w aqueous solution of N-vinylformamide. Dropping was continued over 2 hours to completion and at 1 hour dropping, additional 5 g of aqueous initiator solution was supplemented. After dropping, the reaction solution was heated for further 3 hours to subject it to aging. Thereafter, the reaction solution was added to acetone to precipitate a polymer, which was then dried to obtain Polymer E. This polymer E had a reduced viscosity of 0.6. The results of structural analysis and thermal stability test of Polymer E are shown in Table 1.

Comparative Example 2

10 g of Polymer E and 90 g of concentrated hydrochloric acid were introduced into a separable flask and heated at 80° C. for 5 hours. Thereafter the reaction solution was added to isopropanol to precipitate a polymer, which was then dried to obtain Polymer F. The results of structural analysis and thermal stability test Polymer F are shown in Table 1.

Comparative Example 3

10 g of Polymer E, 0.5 g of hydroxylamine hydrochloride and 7.5 g of desalted water were introduced into a sealed tube and heated at 70° C. to obtain a homogeneous solution. One hour later, a mixed solution of 0.22 g of concentrated hydrochloric acid and 1.78 g of desalted water was added and heated for further 7 hours. The reaction solution was added into methanol to precipitate a polymer, which was then dried to obtain Polymer G. The results of structural analysis and thermal stability test of Polymer G are shown in Table 1.

In Table 1, thermal stability of each polymer may be estimated based on the weight loss trend at heating. Each polymer of each Example exhibits a lesser weight loss percent, thus superior thermal stability than each polymer each Comparative Example.

TABLE 1

| | | polymer structural unit (molar %) | | | | | thermal stability test weight loss (% w/w) | | | |
|---|---|---|---|---|---|---|---|---|---|---|
| | | (1)[a] | (2)[b] | (2)[c] | (3)[d] | (4)[e] | 100° C. | 200° C. | 300° C. | 400° C. |
| Ex. 1 | B | 22 | 39 | 0 | 33 | 6 | 3 | 8 | 27 | 40 |
| Ex. 2 | C | 27 | 13 | 24 | 1 | 35 | 3 | 7 | 24 | 37 |
| Ex. 3 | D | 50 | 23 | 2 | 2 | 23 | 3 | 3 | 13 | 35 |
| Com. 1 | E | 0 | 0 | 0 | 100 | 0 | 2 | 20 | 52 | 68 |
| Com. 2 | F | 0 | 0 | 0 | 0 | 100 | 3 | 7 | 62 | 75 |
| Com. 3 | G | 7 | 47 | 0 | 40 | 6 | 3 | 7 | 40 | 50 |

[a]: lactam;
[b]: amide;
[c]: carboxyl;
[d]: formyl;
[e]: amine

Example 4, Comparative Example 4

(Preparation of Polymer H)

To a one-liter 4-necked separable flask provided with a stirrer, a nitrogen gas inlet and a condenser, 167 g of isopropanol was introduced and deaerated under nitrogen gas stream with agitation for 30 minutes. The flask was heated to 60° C., a mixture of 10 g of N-vinylformamide, 10 g of acrylamide and 13 g of isopropanol was added by portions three times at an interval of 30 minutes, together with 0.1 g, 0.06 g and 0.06 g of 2,2'-azobis-2-amidinopropane hydrochloride. Thereafter polymerization was carried out at 70° C. for 1 hour. The obtained reaction solution was added to methanol to precipitate a polymer, which was then dried to obtain Polymer H. This polymer H had a reduced viscosity of 0.2.

(Preparation of Polymers I and J)

To 20 g of Polymer H, a mixed solution of 58 g of concentrated hydrochloric acid and 321 g of desalted water was added and heated at 80° C. for 8 hours. A precipitate-containing slurry was obtained. The slurry was filtered, the filtrate was recovered, washed with acetone and dried to obtain Polymer I. On the other hand, the filtrate was added to acetone to precipitate a polymer, which was then dried to obtain Polymer J. Polymer I was sparingly water-soluble, whereas Polymer J was water-soluble. The results structural analysis and thermal stability test of these polymers are shown in Table 2.

Example 5

To 20 g of Polymer H, a mixed solution of 58 g concentrated hydrochloric acid and 133 g of desalted water was added and heated at 80° C. for 8 hours. A precipitate-containing slurry was obtained. The slurry was filtered, the filtrate was recovered, washed with acetone and dried to obtain Polymer K. The polymer K was water-soluble. The results of structural analysis and thermal stability test of Polymer K are shown in Table 2.

Comparative Example 5

An acrylamide homopolymer L (average molecular weight: 13,000,000) was tested for thermal stability and the results are shown in Table 2. 1N aqueous NaCl solution containing 0.1 g/dl of Polymer L was purged with nitrogen and then introduced into 3 sealed tubes, heated at 90° C. for 10 hours and a reduced viscosity was measured. Viscosity retention percentage relative to the viscosity before heating is shown in Table 3. It is obvious from Tables 2 and 3 that when compared to the polymers of the present invention, the acrylamide homopolymer (Polymer L) had an inferior thermal stability in the solution state, though somewhat thermally stable in the solid state.

TABLE 2

| | | polymer structural unit (molar %) | | | | | thermal stability test weight loss (% w/w) | | | |
|---|---|---|---|---|---|---|---|---|---|---|
| | | (1)[a] | (2)[b] | (2)[c] | (3)[d] | (4)[e] | 100° C. | 200° C. | 300° C. | 400° C. |
| Ex. 4 | I | 66 | 6 | 11 | 4 | 13 | 7 | 12 | 18 | 22 |
| Comp. 4 | J | 14 | 10 | 33 | 0 | 43 | 7 | 16 | 37 | 50 |
| Ex. 5 | K | 25 | 15 | 22 | 0 | 38 | 3 | 12 | 32 | 40 |
| Comp. 5 | L | 0 | 100 | 0 | 0 | 0 | 3 | 15 | 30 | 55 |

[a]: lactam;
[b]: amide;
[c]: carboxyl;
[d]: formyl;
[e]: amine

Each structural unit in Table 2 has the same meaning as shown in Table 1.

Example 6

To a one-liter 4-necked separable flask equipped with a stirrer, a nitrogen inlet and a condenser, 70 g of desalted water and 14.8 g of acrylamide-2-methylpropanesulfonic acid were introduced and 75 g of an aqueous solution containing 2.8 g of sodium hydroxide was added thereto to neutralize. Then, 10 g of N-vinylformamide, 10 g of acrylamide and 161 g of desalted water were added and air-removed in a nitrogen gas stream under stirring for 30 minutes. Thereafter, the reaction mixture was heated to 60° C. and 5 ml of an aqueous solution containing 34.5 mg of 2,2'-azobis-2-amidinopropane hydrochloride was added. The reaction mixture was heated to 70° C. and polymerized for 5 hours. The resultant water-containing polymeric gel (20 g) was filtered out into a test tube. To the test tube, 0.2 g of hydroxylamine hydrochloride was added and heated at 50° C. for one hour. Then 1.7 g of concentrated hydrochloric acid was added and heated at 70° C. for 8 hours. After reaction, methanol was added to the reaction mixture to precipitate a polymer. The polymer was dried to obtain Polymer M, which had a reduced viscosity of 3.87.

Polymer M was dissolved in 1N aqueous NaCl solution at a concentration of 0.1 g/dl to prepare a sample. After substituting the environment with nitrogen, the sample was sealed in a tube and heated at 90° C. for 10 hours followed by measurement of the reduced viscosity. The viscosity retention percentage relative to the viscosity of the sample before heat treatment is shown in Table 3. The results of compositional analysis and thermal stability test are shown in Table 4.

TABLE 3

|  |  | Viscosity retention (%) |
|---|---|---|
| Example 2 | Polymer C | 99.3 |
| Comp. Ex. 5 | Polymer L | 70.3 |
| Example 6 | Polymer M | 89.0 |

Example 7

To a one-liter 4-necked separable flask equipped with a stirrer, a nitrogen inlet and a condenser, 87 g of desalted water and 75 g of an aqueous solution containing 4.52 g of N-vinylformamide and 5.48 g of methyl acrylamidate were added and stirred under nitrogen gas stream for 30 minutes to remove air. The reaction mixture was then heated to 60° C. and 3 ml of an aqueous solution containing 30 mg of 2,2'-azobis-amidinopropane hydrochloride was added followed by polymerization at 70° C. for one hour. The resultant water-containing polymeric gel (20 g) was filtered out into a test tube and 0.2 g of hydroxylamine hydrochloride was added. After heating at 70° C. for 8 hours, the resultant slurry was filtered. The recovered material was washed with acetone and dried to obtain a polymer. To this polymer (1 g), 17 g of desalted water and 1.34 g of an aqueous solution of twice diluted concentrated hydrochloric acid were added and heated at 80° C. for 4 hours. After reaction, acetone was added to the reaction mixture to precipitate a polymer, which was dried to obtain Polymer N. This polymer had a reduced viscosity of 3.60. The results of compositional analysis and thermal stability test are shown in Table 4.

TABLE 4

| | Polymer structural unit (molar %) | | | | | | | thermal stability test weight loss (% w/w) | | | |
|---|---|---|---|---|---|---|---|---|---|---|---|
| | (1)[a] | (2)[b] | (2)[c] | (2)[f] | (3)[d] | (4)[e] | (7)[g] | 100° C. | 200° C. | 300° C. | 400° C. |
| Ex. 6 M | 20 | 24 | 10 | 0 | 10 | 18 | 18 | 3 | 10 | 30 | 45 |
| Ex. 7 N | 22 | 0 | 16 | 15 | 24 | 23 | 0 | 0 | 3 | 30 | 46 |

[a]: lactam;
[b]: amide;
[c]: carboxyl;
[d]: formyl;
[e]: amine
[f]: ester;
[g]: sulfone In Table 4, each structural unit has the same meaning as shown in Table 1 except the following: ester: general formula (2) in which $R^2=H$, $X=COOCH_3$; and sulfone: structural unit represented by the following formula (7):

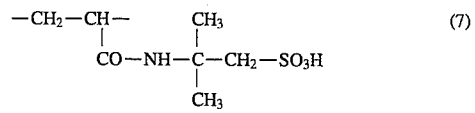

Effects of the Invention

An intramolecular lactam ring structure-containing polymer of the present invention is characterized by a polar group and an improved thermal stability, and is possibly applicable to thermoplastic resin modifier, polymeric additive or petroleum tertiary recovery, lubricant, detergent-dispersant, scale inhibitor, quenching oil polymer, drilling mud thickner, pipe transportable thickner, binder and the like.

What is claimed is:

1. A lactam ring-containing polymer comprising: 20 to 100 molar % of a structural unit represented by the general formula (1); 0 to 70 molar % of a structural unit represented by the general formula (2); and 0 to 70 molar % of a structural unit represented by the general formula (3) and/or a structural unit represented by the general formula (4):

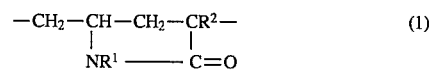

wherein $R^1$, $R^2$ and $R^3$ each represents a hydrogen atom or a methyl group, and X represents $COOR^4$ and/or $CONR^5R^6$ in which $R^4$, $R^5$ and $R^6$ each represents a hydrogen atom or a C1–C4 alkyl.

2. A lactam ring-containing polymer according to claim 1, which comprises 30 to 80 molar % of said structural unit of the general formula (1), 5 to 50 molar % of said structural unit of the general formula (2), and 5 to 50 molar % of said structural unit of the general formula (3) and/or said structural unit of the general formula (4).

3. A lactam ring-containing polymer according to claim 2, which comprises 40 to 80 molar % of said structural unit of the general formula (1).

4. A lactam ring-containing polymer according to claim 1, wherein a solution thereof in 1N aqueous NaCl at a concentration of 0.1 g/dl has a reduced viscosity of 0.01 to 50 dl/g at 25° C.

5. A lactam ring-containing polymer according to claim 1, wherein a solution thereof in 1N aqueous NaCl at a concentration of 0.1 g/dl has a reduced viscosity of 0.05 to 20 dl/g at 25° C.

6. A lactam ring-containing polymer according to claim 1, which is obtained by polymerizing a mixture of a compound of the general formula (5) and a compound of the general formula (6):

(5)

(6)

wherein $R^1$, $R^2$ and $R^3$ each represents a hydrogen atom or a methyl group, and X represents $COOR^4$ and/or $CONR^5R^6$ in which $R^4$, $R^5$ and $R^6$ each represents a hydrogen atom or a C1–C4 alkyl, in a molar ratio of 20:80 to 80:20 and modifying the obtained polymer in the presence of an acid or a base.

7. A lactam ring-containing polymer according to claim 6, wherein said compound of the general formula (5) is N-vinyl formamide.

8. A lactam ring-containing polymer according to claim 6, wherein said compound of the general formula (5) is N-vinyl acetamide.

9. A lactam ring-containing polymer according to claim 6, wherein said compound of the general formula (6) is acrylamide.

10. A lactam ring-containing polymer according to claim 6, wherein said compound of the general formula (6) is an acrylic ester.

11. A lactam ring-containing polymer according to claim 6, wherein a solution of said unmodified polymer in 1N aqueous NaCl at a concentration of 0.1 g/dl has a reduced viscosity of 0.01 to 50 dl/g at 25° C.

12. A lactam ring-containing polymer according to claim 6, wherein a solution of said unmodified polymer in 1N aqueous NaCl at a concentration of 0.1 g/dl has a reduced viscosity of 0.05 to 20 dl/g at 25° C.

13. A lactam ring-containing polymer according to claim 6, wherein said modification is conducted in an aqueous acid solution.

14. A lactam ring-containing polymer according to claim 13, wherein said modification is conducted in an aqueous solution containing an acid in at least equimolar amount relative to the structural unit derived from the compound of the general formula (5).

15. A lactam ring-containing polymer according to claim 6, wherein acrylamide-2-methylpropanesulfonic acid is polymerized as a comonomer.

* * * * *